Dec. 13, 1960   H. L. JONES   2,964,064
FLUID CONDUIT INSULATING MEANS
Filed March 12, 1957   3 Sheets-Sheet 2
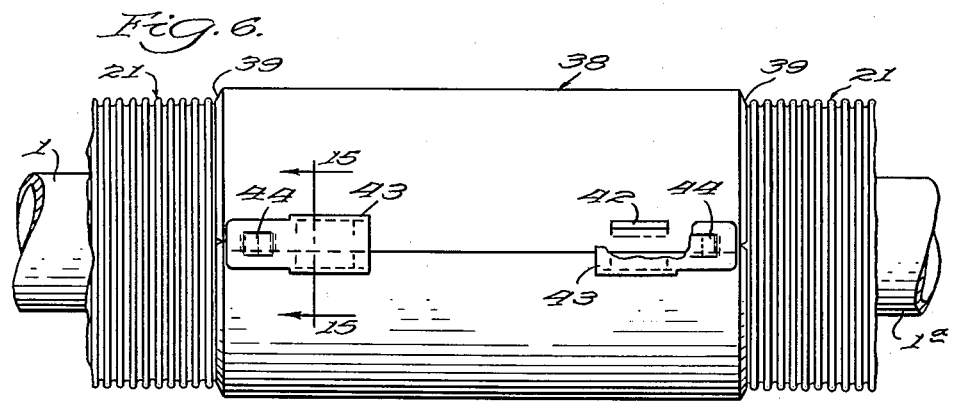
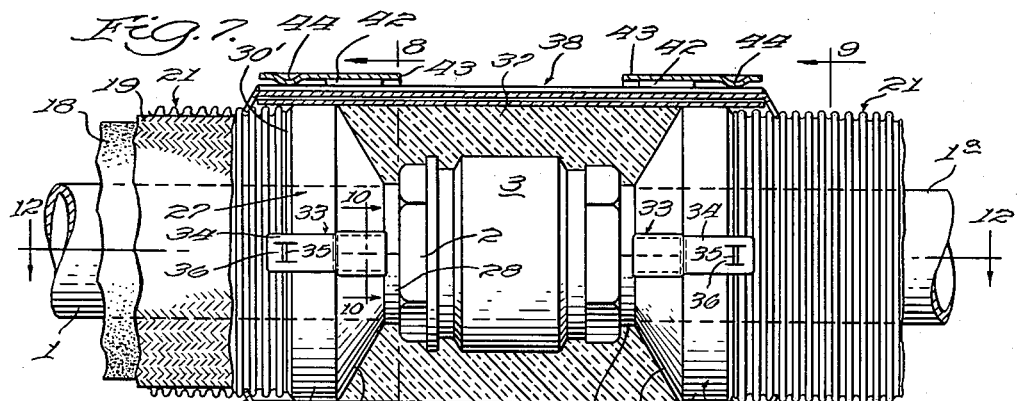
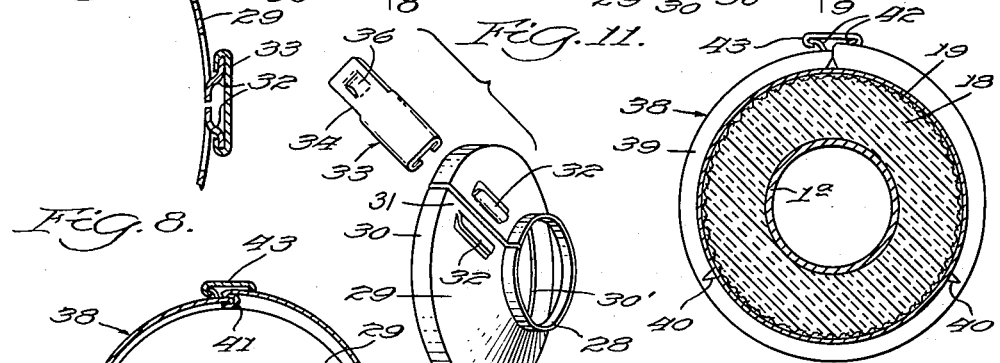
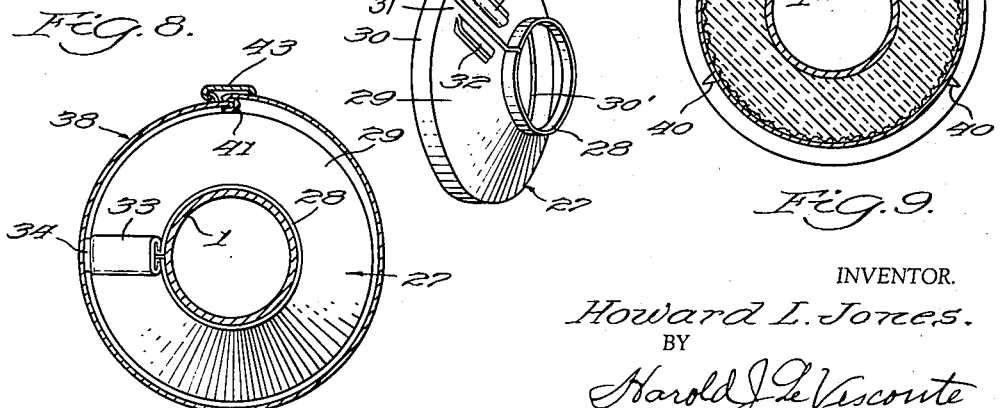
INVENTOR.
Howard L. Jones.
BY
Harold J. LeVicomte
ATTY.

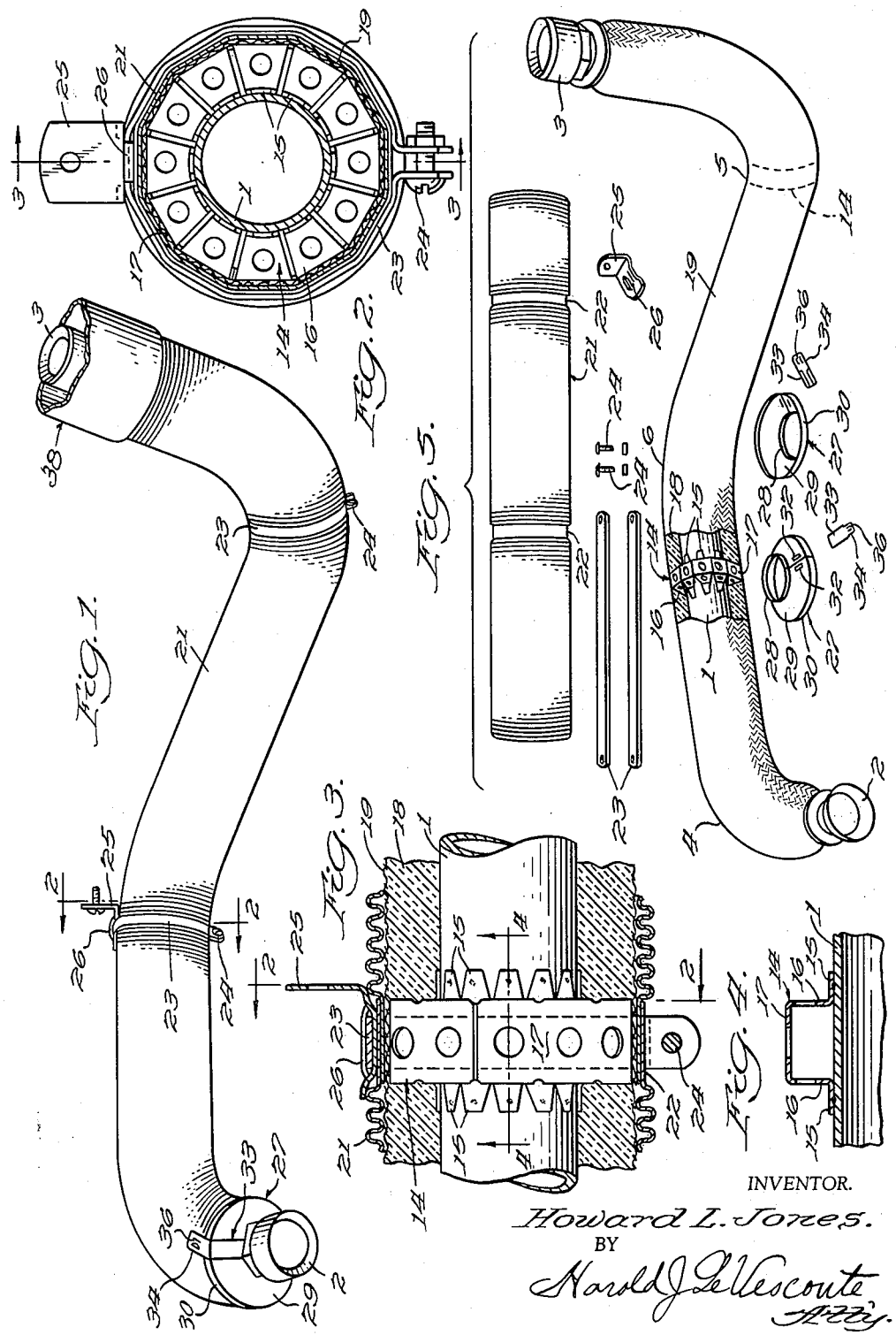

Dec. 13, 1960  H. L. JONES  2,964,064
FLUID CONDUIT INSULATING MEANS
Filed March 12, 1957  3 Sheets-Sheet 3
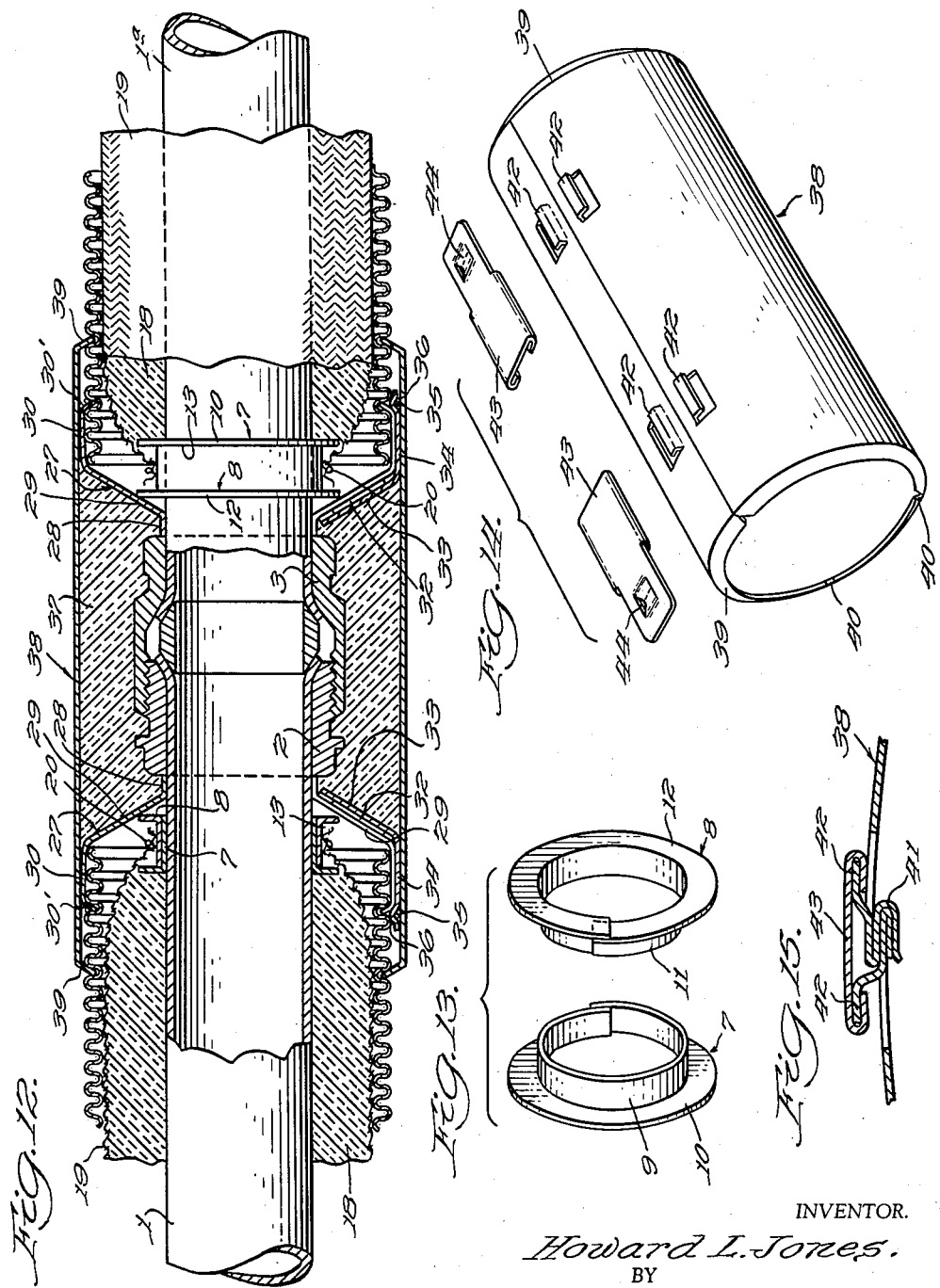
INVENTOR.
Howard L. Jones.
BY
Harold J. Le Vescoute
ATTY.

United States Patent Office 2,964,064
Patented Dec. 13, 1960

2,964,064

FLUID CONDUIT INSULATING MEANS

Howard L. Jones, Sun Valley, Calif., assignor to T-A Mfg. Corp., Los Angeles, Calif., a corporation of California Filed Mar. 12, 1957, Ser. No. 645,597

6 Claims. (Cl. 138—64)

This invention relates to conductors for highly heated gases and liquids and particularly to a novel form of insulated conductor and insulation means for such conductors.

The principal object of the invention is to provide an efficient heat insulation means for tubing employed to conduct highly heated gases or fluids characterized by a flexible metal sleeve coaxially spaced from the tubing and surrounding and protecting a packing of insulating material carried by the exterior of the tubing and including means for maintaining the required coaxial relation between the sleeve and the tubing.

Another object of the invention is to provide an assembled tubing for conducting heated gases or fluids including insulating means surrounding the tubing and affording means for supporting the tubing at spaced points in the length thereof adapted to support the tubing directly without imposition of supporting strains on the insulation.

Still another object of the invention is to provide an insulation means for interconnected tubing elements for conducting heated gases or fluids including means for insulating the interconnection of two of such tubing elements adapted to permit removal thereof for inspection or disconnection without disturbing the insulation surrounding the separate elements.

With the foregoing objects in view, together with such additional objects and advantages as may subsequently appear, the invention resides in the parts, and in the construction, combination and arrangement of parts described, by way of example, in the following description of a presently preferred embodiment of the invention; reference being had to the accompanying drawings which form a part of said specification and in which drawings:

Fig. 1 is a perspective view of a length of tubing with the insulating means applied thereto and further showing hanger means and a portion of a joint insulating means at one end thereof, Fig. 2 is an enlarged transverse cross sectional view taken on the lines 2—2 of Figs. 1 and 3, Fig. 3 is a fragmentary longitudinal view taken on the line 3—3 of Fig.2, Fig. 4 is a fragmentary sectional view taken on the line 4—4 of Fig. 3, Fig. 5 is a partially exploded view of the component parts of the assembly shown in Fig. 1; a portion thereof being shown in section for clearness of illustration, Fig. 6 is an enlarged side elevation of the insulating means for covering a joint between connected tubes each having the form of insulation shown in the preceding figures, Fig. 7 is a partially sectional, medial longitudinal view of Fig. 6, the parts being shown in section as on the line 7—7 of Fig. 6, Figs. 8, 9 and 10 are, respectively, sectional views taken on the lines 8—8, 9—9 and 10—10 of Fig. 7, Fig. 11 is an exploded view in perspective of one of the end caps and its securing means, Fig. 12 is a further enlarged, medial sectional view taken on the line 12—12 of Fig. 7, Fig. 13 is a perspective, exploded view of the component parts of one of the end ring assemblies, Fig. 14 is an exploded view of the component parts of the inspection and joint access sleeve, and Fig. 15 is a still further enlarged, fragmentary sectional view taken on the line 15—15 of Fig. 6.

The invention is shown as applied to a tubing 1 having connecting means 2 and 3 at its opposite ends for connection with the elements to and from which it carries the heated gases or fluid said tubing having bends 4, 5 and 6 to suit the place in which it is to be installed. Adjacent each end, the tubing carries end ring assemblies each comprising an inner ring 7 and an outer ring 8. The inner rings include a tube engaging collar portion 9 and a radially outwardly extending flange portion 10. The outer rings are likewise provided with a collar portion 11 adapted to be seated on the outer face of the collar portion 9 of the inner ring 7 and a radially outwardly extending flange 12. The inner rings are welded to the outer surface of the tubing 1 and the outer rings are then welded on the inner rings with the flanges of the rings oppositely disposed to provide an annular channel 13 for purposes later to be described. The rings 7 and 8 are preferably split so that they can be opened for insertion on the tubing and thereafter be held closely around the tubing while being welded thereto.

At spaced points along its length, the tubing has spacing collars 14 welded thereto; said collars being formed from a metal strip notched along its side edges to provide foot portions 15 and thence bent into modified U-shape (see Fig. 4) with the foot portions 15 bent outwardly. The notches in the wide edges are arranged in opposed pairs and are closely spaced and have an included angle such that the strip can be readily bent into a circle surrounding the tubing; the opposing ends of the notches forming weakened points allowing the strip to be readily bent along lines connecting each pair of notches. As a result, the outer periphery of the strip assumes a polygonal configuration as best shown in Fig. 2. Preferably, the sides 16 of the U-shaped portion as well as the outer portion 17 are perforated to reduce the cross section of metal available to transmit heat and to allow heated air within the spacer ring to circulate into the insulation.

The tubing is covered with a thick layer 18 of fibrous insulation such as glass fiber or mineral wool extending between adjacent spacing collars and between the end rings and the spacing collars and the entire tubing with the said layer and spacing collars covered by a tubular cover 19 formed of glass cloth with the opposite ends extending into the grooves 13 and tied therein by tie wires 20. The thus insulated length of tubing is then enclosed by a wear resisting cover 21 comprising lengths of thin metal tubing which is closely and deeply transversely corrugated. These lengths are made up in the longest lengths which may be practically so formed and as many as required are welded together as at 22 to form a continuous cover. As made up, the cover is slightly shorter than the length of tubing to be covered so that the corrugations are slightly stretched. Also the corrugations in the cover 21 permit it to be readily bent to conform to the bends in the tubing. The spacing collars are located along the tubing so as to be at or closely adjacent to the bends in the tubing to maintain the coaxial relation between the tubing and insulation and the cover 21, the sections from which the cover is made being so chosen as to length as to bring the seams 22 at the points at which the spacing collars are located. The cover is clamped to the spacing collars by encircling clamps 23 and clamp screws 24 and these clamps may also serve to secure supporting brackets as indicated at 25 wherein an angle bracket is formed with a struck out loop portion 26 through which the clamp extends. Thus, support is afforded for the tubing directly without the load being imposed on the insulating material.

Prior to thus securing the cover to the spacing collars, the ends of the cover are secured to the ends of the tubing by end members 27 of generally frusto-conical configuration. These end members are formed of thin sheet metal and are split at one side to permit them to be opened for placing around the tubing at a point closely adjacent the end fittings 2 and 3. Each end member comprises a tubing engaging collar 28, a frusto-conical end face 29 and an outer wall portion 30 terminating in an inturned flange 30' adapted to engage one of the grooves formed by the corrugations in the end of the cover. Adjacent the split side 31, the end face is formed with opposed struck out tongues 32 over which a locking slide 33 engages to hold the end member closed around the tubing and in engagement with the groove in the cover. Since the cover is slightly shorter than the length of the tubing and must be stretched to be engaged by the end members, it exerts a pull on the end members and their movement in response to the pull of the cover is resisted by engagement of the inner faces of the end members with the outer flanges 12, 12 of the end rings. After the cover ends have thus been secured, the clamps 23 are tightened to further secure the cover in place on the tubing, such tightening also serving to secure any supporting brackets as may be mounted on the clamps as before described. The locking slides 33 are preferably secured by providing an extension portion 34 at one end thereof which extends beyond the outer perimeter of the end member and which is bent down against the cover and secured by a tie wire 35 extending around one of the grooves in the cover and through an eye 36 formed in the said extension by striking out the center portion thereof as best shown in Fig. 7.

Referring next to Figs. 6 through 9 and 12 through 15 there is shown the means by which the ends of two of the above described insulated tubing assemblies are connected and the connection insulated. Referring to Figs. 7 and 12 it will be noted that the ends of tubing elements 1 and 1a are connected by the coupling elements 2 and 3. The space between the adjacent end members is filled by a packing 37 of fibrous material which is enclosed by a split sleeve member 38 formed of thin sheet metal and having the ends 39, 39 diagonally inturned to engage grooves in the adjacent covers slightly beyond the grooves engaged by the end members 27; the said inturned ends being notched at spaced points as at 40 to facilitate opening of the sleeve incident to applying it or removing it. One side of the sleeve is doubled on itself on the inner face of the sleeve and thence bent outwardly to form a receiving slot 41 for the opposite edge thereof which (see Fig. 15) is also doubled on itself, and both side edges are provided with opposed pairs of struck out tongue elements 42 which are engaged by the inturned edges of slide members 43 which secure the sleeve in closed condition over the packing 37 and in engagement with the grooves of the covers 21 of the joined pipe assemblies. The slide members 43 are provided with struck out eyelets 44 adapted to be engaged by tie wires to secure the slide members against displacement. Thus even the joint between the tubing assemblies is adequately insulated and if necessity should require it, the insulation around the coupling means can readily be removed so that access may be had to the coupling for inspection or uncoupling of the tubing assemblies.

Thus there has been provided an insulating means for tubes or pipes which carry highly heated gases or fluids and which both provides adequate insulation and an external surface which is not subject to wear. Further, the cover means which protects the insulating material is readily bent to conform to any bends formed in the tubing elements to which it is applied. Still further, the cover means serves as an anchoring means for the means by which connected portions of the tubing or pipe are also insulated and this insulating means is adapted to be removed for inspection or uncoupling of the joined tubing or pipe sections. In this connection it is also to be noted that when the tubing is employed to carry oil or other fluids, the welding of the end rings to the tubing serves to prevent any of the fluid escaping from the coupling from impregnating the packing surrounding the tubing. Also it should be noted that when and if necessary the insulation and cover means can be readily removed and replaced, this operation involving only loosening of the clamps and removal of the locking slides from the end members after which the entire assembly can quickly be dismantled. While the disclosed embodiment of the invention is for preventing escape of heat from heated gases or fluids, it is obvious that it will serve to prevent the heating of cold fluids or gases with equal efficiency.

Under some conditions, such as lengths of straight tubing, it will be evident that the cover need not be thus corrugated throughout its length and that under such conditions it may be provided with sufficient corrugations at each end and possibly between adjacent spacing collars to provide resilience to accommodate linear thermal expansion and contraction of the tubing and to provide anchoring grooves for the end members and sleeves covering tubing connections.

While in the foregoing specification there has been described a presently preferred embodiment of the invention, it is not to be inferred therefrom that the invention is limited to the exact form so disclosed by way of example, and it will be understood that the invention includes as well all such changes and modifications in the parts and in the construction, combination and arrangement of parts as shall come within the purview of the appended claims.

I claim:

1. In an insulated tube for conducting fluids, a length of tubing having means at each end thereof affording connection with fluid containing instrumentalities and heat insulating means surrounding said tubing and extending therealong between said connecting means; said insulating means comprising an external tubular cover of substantially greater diameter than said tubing, said cover being formed of resilient metal and having closely spaced peripheral corrugations formed therein along the major proportion of its length, means connecting each end of said cover to said tubing in coaxial spaced relation at each end thereof and disposed closely adjacent to the respective connecting means, other spacing means carried by said tubing at at least one point between said ends engaging the interior of said cover effective to maintain the said coaxial relation with said tubing, and heat insulating material substantially filling the space between said cover and said tubing; said cover connecting members each comprising a generally frusto-conical sheet metal member having an inner, tubing engaging surface and an outer edge portion engageable with one of the corrugations of said cover adjacent to the end of said cover; said member having a radially extending split therein affording means for opening said member for application to said tubing from the side thereof and to open said member for engagement with said cover, and removable means for holding said end member in closed position around said tubing and cover.

2. An insulated tubing as claimed in claim 1 in which said cover is of less length than the tubing and in which said corrugations permit it to be stretched between the cover end connecting means.

3. In an insulated tube for conducting fluids, a length of tubing having means at each end thereof affording connection with fluid containing instrumentalities and heat insulating means surrounding said tubing and extending therealong between said connecting means; said insulating means comprising an external tubular cover of substantially greater diameter than said tubing, said cover being formed of resilient metal and having closely spaced peripheral corrugations formed therein along the major proportion of its length, means connecting each end of said cover to said tubing in coaxial spaced relation at each end thereof and disposed closely adjacent to the respective connecting means, other spacing means carried by said tubing at at least one point between said ends and engaging the interior of said cover effective to maintain the said coaxial relation with said tubing, and heat insulating material substantially filling the space between said cover and said tubing; the corrugations on said cover being interrupted at at least one point intermediate the ends of the cover by a narrow, uncorrugated portion which overlies said other spacing means for maintaining said cover in said coaxial relation, and a clamp means surrounding said uncorrugated portion of said tubing and clamping it against said other spacing means.

4. In an insulated tube for conducting fluids, a length of tubing having means at each end thereof affording connection with fluid containing instrumentalities and heat insulating means surrounding said tubing and extending therealong between said connecting means; said insulating means comprising an external tubular cover of substantially greater diameter than said tubing formed of resilient metal and having closely spaced peripheral corrugations formed therein along the major proportion of its length, means connecting each end of said cover to said tubing in coaxial spaced relation at each end thereof and disposed closely adjacent to the respective connecting means, other spacing means carried by said tubing at at least one point between said ends and engaging the interior of said cover effective to maintain the said coaxial relation with said tubing, and heat insulating material substantially filling the space between said cover and said tubing; said tubing having means fixed to each end thereof, each of said means forming a peripheral groove around said tubing, and in which said insulating material and said other spacing means are surrounded by a fabric sleeve having the ends thereof secured in said peripheral grooves and over which said cover extends.

5. In an insulated tube for conducting fluids, a length of tubing having means at each end thereof affording connection with fluid containing instrumentalities and heat insulating means surrounding said tubing and extending therealong between said connecting means; said insulating means comprising an external tubular cover of substantially greater diameter than said tubing formed of resilient metal and having closely spaced peripheral corrugations formed therein along the major proportion of its length, means connecting each end of said cover to said tubing in coaxial spaced relation at each end thereof and disposed closely adjacent to the respective connecting means, other spacing means carried by said tubing at at least one point between said ends and engaging the interior of said cover effective to maintain the said coaxial relation with said tubing, and heat insulating material substantially filling the space between said cover and said tubing; said tubing having means fixed to each end thereof and each forming a peripheral groove around said tubing, and in which said insulating material and said other spacing means are surrounded by a fabric sleeve having the ends thereof secured in said grooves; said groove forming means serving additionally to hold said end members against endwise movement under the tension of said cover.

6. In an insulated tube for conducting fluids, a length of tubing having means at each end thereof affording connection with fluid containing instrumentalities and heat insulating means surrounding said tubing and extending therealong between said connecting means; said insulating means comprising an external tubular cover of substantially greater diameter than said tubing, said cover being formed of resilient metal and having pluralities of peripheral corrugations formed therein at each end thereof, means connecting said cover to said tubing at each end thereof and for maintaining said cover in coaxial spaced relation to said tubing comprising end members encircling and engaging said tubing adjacent said connecting means and engaging one of said corrugations; each of said end members being split at one side thereof to permit application to said tubing from the side thereof and to be opened to fit over said cover, and detachable locking means associated with each of said end members operable to hold the end member in closed position around said tubing and said cover.

References Cited in the file of this patent

UNITED STATES PATENTS

| 1,072,253 | Peck | Sept. 2, 1913 |
| 1,565,254 | Bystrom | Dec. 15, 1925 |
| 1,949,197 | Cornell | Feb. 27, 1934 |
| 2,330,966 | Gattwald et al. | Oct. 5, 1943 |
| 2,451,146 | Baker et al. | Oct. 12, 1948 |
| 2,478,552 | Williamson | Aug. 9, 1949 |
| 2,613,958 | Richardson | Oct. 14, 1952 |
| 2,644,112 | Isenberg | Dec. 29, 1953 |

FOREIGN PATENTS

| 445,576 | Great Britain | Apr. 14, 1936 |
| 652,331 | Great Britain | Apr. 18, 1951 |